Jan. 19, 1954  F. A. LOEBEL  2,666,499
CENTRIFUGAL SEPARATOR
Filed April 11, 1951  3 Sheets-Sheet 1

Inventor
Frederick A. Loebel

Jan. 19, 1954   F. A. LOEBEL   2,666,499
CENTRIFUGAL SEPARATOR
Filed April 11, 1951   3 Sheets-Sheet 2

Inventor
Frederick A. Loebel

Jan. 19, 1954 — F. A. LOEBEL — 2,666,499
CENTRIFUGAL SEPARATOR
Filed April 11, 1951

Inventor
Frederick A. Loebel

Patented Jan. 19, 1954

2,666,499

UNITED STATES PATENT OFFICE 2,666,499

CENTRIFUGAL SEPARATOR

Frederick A. Loebel, Milwaukee, Wis., assignor to Cleaver-Brooks Company, a corporation of Wisconsin Application April 11, 1951, Serial No. 220,449

7 Claims. (Cl. 183—32)

This invention relates to a separator and more particularly to a centrifugal type separator for use in evaporators and the like for separating entrained particles from the steam in order to obtain water from the steam of extreme purity.

The primary object of this invention is to provide a new and improved separator of the character described. In general it is the object of this invention to provide a centrifugal type separator capable of producing water from steam evolved from an evaporator, which may be condensed to water having a total conductivity reading of substantially less than five parts per million NaCl with a feed water containing substantially more than 50,000 parts per million in the evaporator body from which the steam was evolved.

A further object of this invention is to provide a separator of the character described capable of producing extremely pure water from steam having substantial entrained impurities.

A further object is the provision of a separator which may be incorporated in evaporator bodies presently constructed without necessitating substantial changes in the evaporator.

A further object is the provision of a separator having in general a cylindrical body into which is tangentially introduced steam, or other gaseous stream, from a plurality of inlet tubes to produce a whirling stream within the body, the stream losing its entrained particles while in the body and then discharging through a cylindrical passage concentrically mounted within the cylindrical body, said passage having its opening spaced longitudinally of the body from the incoming stream.

Figure 1:
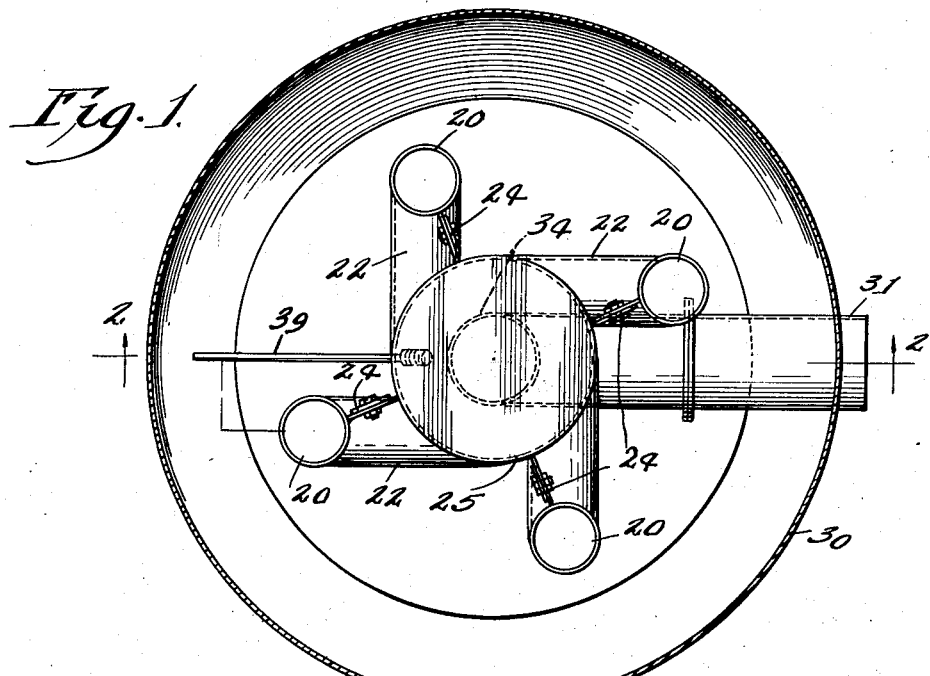
Figure 2:
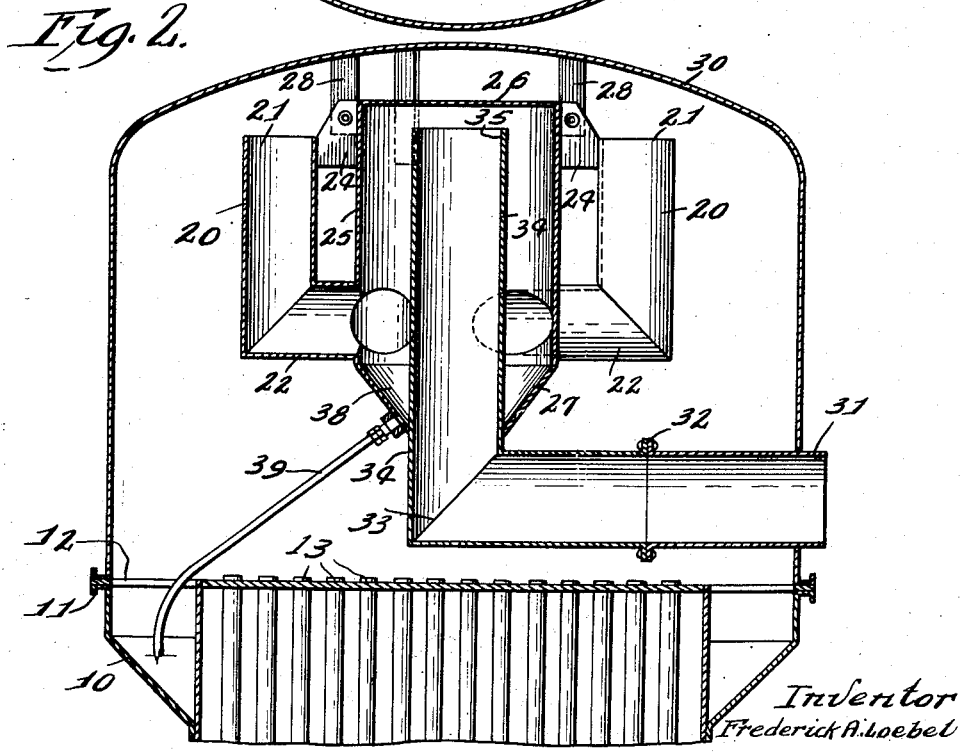
Figure 3:
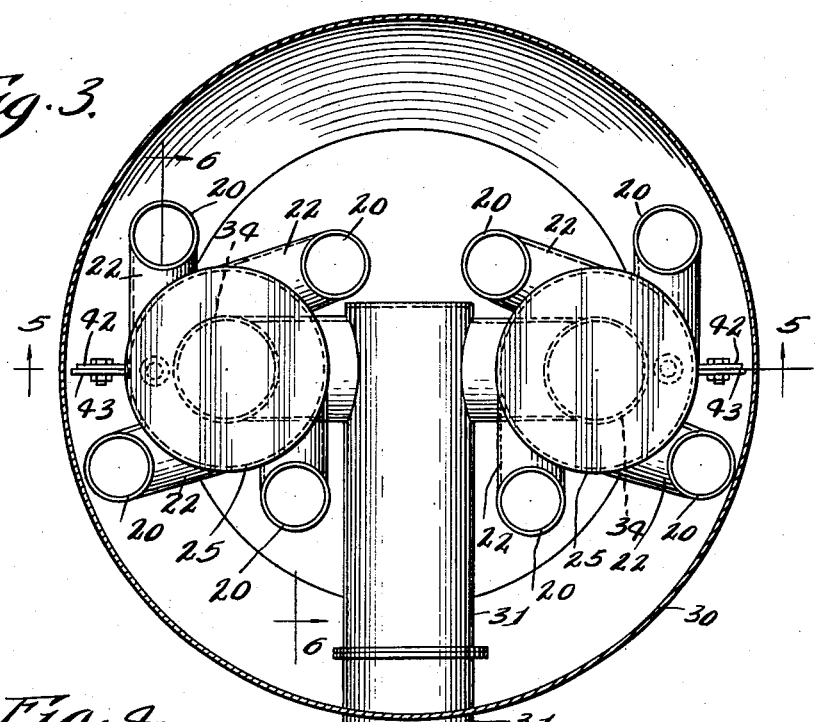
Figure 4:
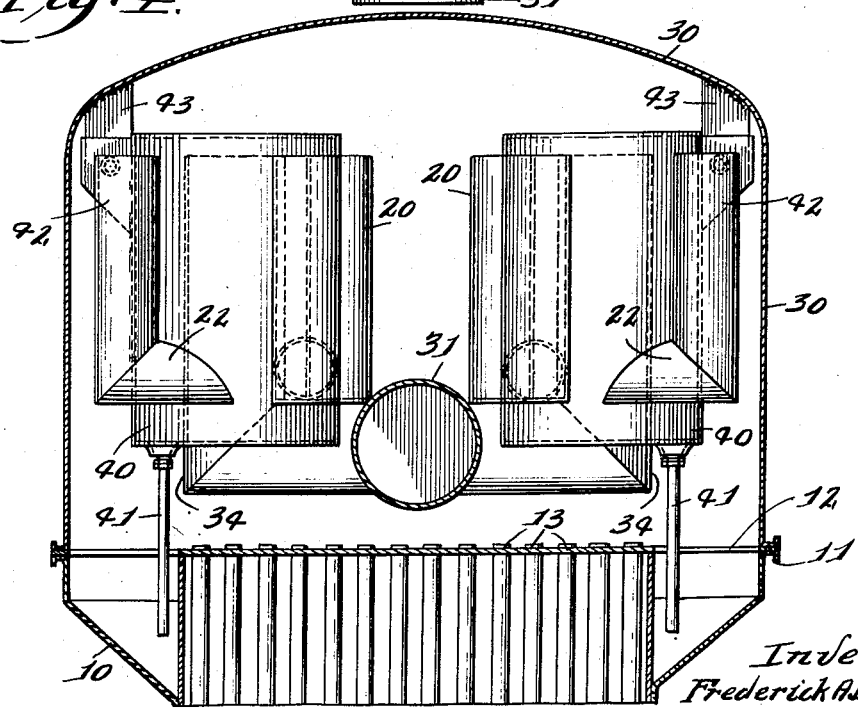
Figure 5:
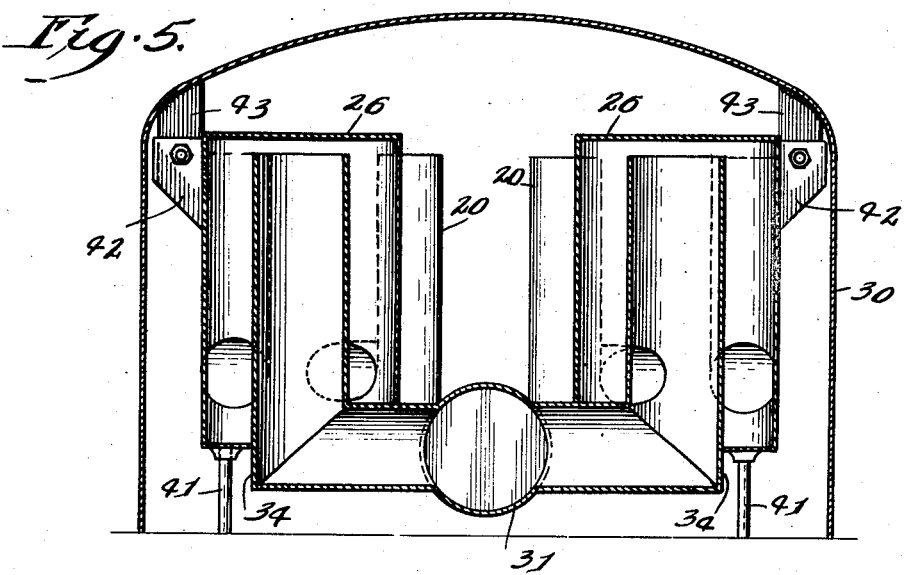
Figure 6:
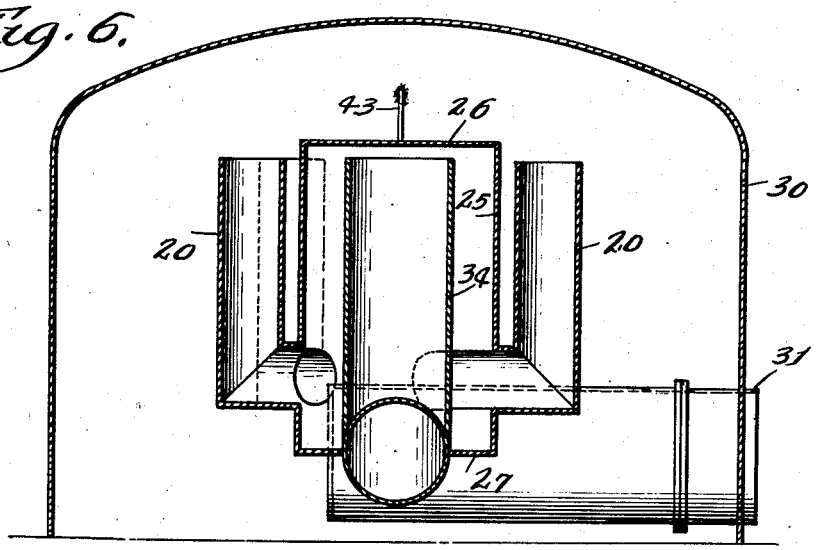

Other features, advantages and objects of this invention will be apparent from the following description and with reference to the accompanying drawings illustrating exemplary embodiments of the invention. Of the drawings, Fig. 1 is a top plan view of the evaporator illustrated in Fig. 2 with the top thereof removed so that the separator may be clearly seen; Fig. 2 is a sectional view taken through the evaporator body and separator therein as indicated by line 2—2 in Fig. 1; Fig. 3 is a view similar to Fig. 1 of an alternate embodiment; Fig. 4 is a vertical view of the evaporator shown in Fig. 3 with the side removed so as to show the separator within the evaporator bonnet; Fig. 5 is a vertical sectional view taken as indicated by line 5—5 in Fig. 3; and Fig. 6 is a vertical sectional view taken as indicated by line 6—6 in Fig. 3.

While I have shown and shall hereinafter describe preferred embodiments of this invention, it is to be understood that it is capable of many modifications. Changes, therefore, in the construction and arrangement may be made without departing from the spirit and scope of the invention as disclosed in the appended claims.

The invention resides in the separator by which the entrained particles are removed from the steam or the like and will hereinafter be described as utilized in the top of an evaporator body. It will be understood, however, that the invention may be used in any installation where it is desired to obtain separation of entrained particles from a gaseous stream.

As indicated in Figs. 2 and 4, the evaporator shell 10 will have a flange 11 at its top to which is connected the top tube sheet 12 supporting tubes 13 of a tube bundle within the evaporator. In operation, solution such as sea water, fresh water, or partially treated water of any origin is introduced into the bottom (not shown) of the evaporator body and is flashed into steam within the tubes 13, or in some installations and under some conditions the water level in the evaporator may even extend above the tubes. The steam in a vapor compression still is drawn through a separator to remove entrained particles, is then taken out of the evaporator body and compressed and returned to the space around the tubes 13. Thus the heat from the compressed steam is used to raise the temperature of the solution within the tubes 13.

In order to obtain high steam purity, in the order of less than 1.0 p. p. m. dissolved solids by the conductivity method, it is necessary to have a very efficient separator for removing entrained particles. This high purity is particularly desirable in vapor compression evaporators to minimize the accumulation of scale on the lobes or impellers of steam compressors employed. High purity is also desired where distilled water is produced from sea water, for example, for use in storage batteries on submarines. The separator of this invention is one of the centrifugal type employing a plurality of inlet tubes 20, here shown as four in number, arranged symmetrically about the separator body 25. The inlet tubes 20 each has an open end 21 into which steam passes to gain entrance to the body of the separator. These tubes are generally arranged vertically with a horizontal connecting portion 22 which directs the steam tangentially into the body of the separator. It will be noted that the horizontal connecting portions 22 each terminates at its intersection with the cylindrical body 25. Brackets 24 extend between the upper end of the tubes and the body 25 to provide rigidity for the structure.

The relative size of the parts of the separator is important in securing the greatest separation of particles. The inlet tubes 21 determine the tangential velocity, which in the illustrated separator may range from 40 to 60 feet per second with an average of 50. From the basic dimension of the inlet tubes, the size of the other parts of the separator is determined. The distance, vertically, between the center line of the tangential portions 22 and the open end of the outlet branch 34 is made approximately four times the diameter of the inlet tubes. This determines the number of revolutions the steam makes inside the cylinder before passing into branch 34 leading to the compressor (not shown). The dimension here given permits about one and one quarter turns. The diameter of the main body is also four times the diameter of the inlet tubes. The outlet branch 34 is half the diameter of the main body. With these dimensions a separator may be built for a pressure drop of the order of four inches of water.

Straps 23 are connected with the brackets 24 and with the top of the evaporator bonnet 30 which is secured to the main portion of the evaporator 10. An outlet header 31 extends through the side of the bonnet 30 and is connected by a flange 32 and elbow 33 to an upright branch portion 34. This branch portion extends concentrically within the body 25 and terminates in an open end 35 adjacent the closed end 26 of the body. Thus the whirling stream of steam passes upwardly between the body 25 and branch 34 and enters the open end 35 of the branch to be conducted through the discharge header 31.

In many existing evaporator bodies the height of the bonnet 30 on the evaporator will not permit a single separator of sufficient size and capacity to be installed therein. In such instances, a pair of separating units may be combined in parallel as illustrated in Figs. 3 and 4 so that a single discharge header 31 will conduct steam out of the evaporator from both separators. Each of the separators used is essentially the same as illustrated for the single unit installation shown in Figs. 1 and 2. Theoretically each of the separators in a parallel system such as shown in Fig. 3 will handle one-half of the steam load and the relationships between the sizes of the inlet tubes and the separator body are retained.

Means are provided to drain the separated particles from the separator and return them to the solution chamber in the evaporator. In Fig. 2, the conical bottom 27 of the body forms a well 36 about the branch 34 and a line 39 extends from the well 36 to a liquid seal in the solution chamber (not shown) of the evaporator. In Fig. 4 showing two separators mounted in parallel, separated particles may gather in the bottom 40 of the separator bodies and may be conducted to the solution chamber by means of drain lines 41 which also extend below the liquid level in the evaporator to effect a seal.

Any means may be provided for mounting the separators within the evaporator bonnet. As illustrated in Figs. 4 and 5, brackets 42 may be secured to the separator body and to straps 43 in turn secured to the bonnet 30.

In the separator of this invention, a continuous wetted surface is provided against which the droplets entrained in the steam may impinge and adhere. Tests have shown that the separator can consistently produce water with as low as 0.3 part per million NaCl shown by total conductivity reading when the concentration of the solution within the evaporator body was of the order of 70,000 parts per million. When operating with a feed water which had been softened, condensate obtained from the steam passing through the separator showed impurities of the order of one-half part per million and less.

I claim:

1. A centrifugal steam separator adapted to operate within a steam chamber and comprising, an upright cylindrical main body closed at its ends and adapted to receive a swirling stream of steam for separating out entrained particles, a plurality of inlet tubes arranged generally parallel to the main body and each having a connecting portion for conducting steam from the tube into the main body near one end thereof, said connecting portions being joined tangentially with the body to produce said swirling stream, a discharge header having an outlet extending concentrically into the main body and terminating with an open end adjacent the end of the body opposite said inlet tube connections with the main body, the main body having a length to permit at least one turn of the incoming steam around the outlet header between the inlets and outlet, and means for removing separated particles from the separator.

2. A centrifugal steam separator adapted to operate within a steam chamber and comprising, a discharge header having an upright branch portion open at its upper end, a main body having a cylindrical sidewall concentrically arranged about said branch to provide a steam passage between the sidewall and the branch having continuous wetted bounding wall surfaces, a closed end on the body adjacent and spaced from the open end of the branch, the lower end of the body being closed about the discharge branch and providing a well for collecting separated particles, a plurality of inlet tubes about the body each having an upright portion open at its upper end and a connecting portion at the other end for introducing steam tangentially into the separator body adjacent the well, and means for removing separated particles from the well.

3. A separator as specified in claim 2, in which the distance between the centers of the connecting portion of the inlets and the open end of the discharge header branch is approximately four times the diameter of the inlet tubes.

4. A centrifugal separator for use within the steam chamber of a distillation apparatus comprising, a circular cylindrical body arranged with its axis vertical and having a closed flat top and a closed bottom, a plurality of inlet tubes evenly spaced about the body and each being arranged with its axis parallel to the axis of the body, said tubes being spaced from the body and each having a connecting tube extending normal to the axis of the inlet tube and communicating with the interior of the body to direct an incoming stream tangentially into the body, the positioning of said connecting tubes being adapted to produce a centrifugal swirling action of the stream in the body, and an outlet including a discharge header having a vertical branch extending through the bottom of the body to an open end thereof adjacent said closed flat top, said branch being concentric within the body to provide a passage for the stream between the branch and body.

5. A separator as specified in claim 4, in which the top of the inlet tubes and the top of the discharge branch are arranged substantially in the same horizontal plane and said cylindrical separator body has a diameter substantially equal to four times the diameter of the inlet tubes to provide for substantially minimum pressure drop through the separator.

6. In a water evaporator having a bonnet above a tube bundle for enclosing a vapor space, means for separating entrained particles from steam formed in the evaporator and directed to the vapor space, comprising a separator adapted to be mounted in said vapor space and having a body of generally cylindrical form with a closed top and bottom, a plurality of inlet tubes extending generally parallel to the body for conducting steam downwardly and then inwardly into the separator body, said tubes having portions for introducing said steam tangentially into the lower portion of the body to produce a whirling stream in the body, a discharge header for conducting the steam from the separator out of the evaporator including an upright branch extending through the bottom of the body to an open end adjacent said closed top and means for removing separated particles from the evaporator body and returning them to the evaporator.

7. In an evaporator as specified in claim 6, a separator including a pair of separator bodies each having a plurality of inlet tubes and a discharge branch, said discharge branches being connected in parallel with said discharge header.

FREDERICK A. LOEBEL.

References Cited in the file of this patent

UNITED STATES PATENTS

| Number | Name | Date |
|---|---|---|
| 891,474 | Gressley | June 23, 1908 |
| 979,210 | Serrell | Dec. 20, 1910 |
| 1,523,916 | Tompkins | Jan. 20, 1925 |
| 1,568,413 | Peebles | Jan. 5, 1926 |
| 1,737,680 | Pinkham | Dec. 3, 1929 |
| 1,923,515 | Stull | Aug. 22, 1933 |
| 2,112,321 | Wood | Mar. 29, 1938 |
| 2,509,505 | Johnson | May 30, 1950 |
| 2,537,346 | Hensey | Jan. 9, 1951 |

FOREIGN PATENTS

| Number | Country | Date |
|---|---|---|
| 664,042 | Great Britain | Jan. 25, 1949 |